US006845705B1

(12) United States Patent
Chen

(10) Patent No.: US 6,845,705 B1
(45) Date of Patent: Jan. 25, 2005

(54) BARBECUE GRILL WITH AN ADJUSTABLE GRID

(76) Inventor: Shang-Chih Chen, No. 42-3, Hanyang St., North Dist., Taichung (TW)

( * ) Notice: Subject to any disclaimer, the term of this patent is extended or adjusted under 35 U.S.C. 154(b) by 0 days.

(21) Appl. No.: 10/816,437

(22) Filed: Mar. 31, 2004

(51) Int. Cl.[7] ............................. A47J 37/00; A23L 1/00
(52) U.S. Cl. ............................. 99/340; 99/450; 99/482; 126/25 R; 126/9 R
(58) Field of Search .................. 99/339, 340, 444–450, 99/481, 482; 126/25 R, 9 R, 41 R, 200, 192, 25 A, 9 A, 39 B, 25 AA, 29, 30

(56) References Cited

U.S. PATENT DOCUMENTS

| 3,298,301 | A | * | 1/1967 | Lowndes | 99/340 |
|---|---|---|---|---|---|
| 3,785,275 | A | * | 1/1974 | Keats et al. | 99/446 |
| 5,458,053 | A | * | 10/1995 | Hsiao | 99/444 |
| 5,471,916 | A | * | 12/1995 | Bird et al. | 99/446 |
| 5,582,094 | A | * | 12/1996 | Peterson et al. | 99/445 |
| 5,617,779 | A | * | 4/1997 | Dutczak | 99/450 |
| 5,666,940 | A | * | 9/1997 | Kreiter | 126/30 |
| 5,720,272 | A | * | 2/1998 | Chiang | 126/25 R |
| 5,865,099 | A | * | 2/1999 | Waugh | 99/340 |
| 6,119,679 | A | * | 9/2000 | Galvin | 126/41 R |
| 6,131,505 | A | * | 10/2000 | Lin | 99/340 |
| 6,257,130 | B1 | * | 7/2001 | Schlosser | 99/482 |
| 6,776,084 | B2 | * | 8/2004 | Wild | 99/339 |

\* cited by examiner

Primary Examiner—Timothy F. Simone
(74) Attorney, Agent, or Firm—Dellett & Walters

(57) ABSTRACT

A barbecue grill has a stand, a body, a grid and an adjusting device. The body is attached to the top of the stand. The grid is adjustably mounted on the body with the adjusting device. The adjusting device has a shaft and a positioning device. The shaft is moveably extended through the body and is rotatably connected to the grid. The positioning device is mounted between the body and the grid and is connected to the shaft to hold the shaft at a desired position. Accordingly, the grid can be rotated away from the body when the user want to add charcoal into the body or pick the roasted food from the grid. The use of the barbecue grill is convenient and versatile.

6 Claims, 4 Drawing Sheets

BARBECUE GRILL WITH AN ADJUSTABLE GRID

BACKGROUND OF THE INVENTION

1. Field of the Invention

The present invention relates to a barbecue grill, and more particularly to a barbecue grill with a grid adjustable in height and moveable to make the barbecue grill versatile and convenient in use.

2. Description of Related Art

A conventional barbecue grill substantially comprises a stand and a body supported on the stand to roast or toast food. In use, a heat generator, such as gas stove or charcoal fire is mounted on the body for generating heat. A grid is separately mounted on the body to support food to be roasted or toasted by the heat generated by the heat generator.

However, the grid on the conventional barbecue grill is not adjustable and not moveable, the grid must be removed away from the body is necessary for adding charcoal into the body so that the use of the conventional barbecue grill is inconvenient. In addition, the user must pick the roasted food from the grid above the heat generator at a high temperature condition, so the user is easily burned.

To overcome the shortcomings, the present invention tends to provide a barbecue grill with an adjustable grid to mitigate or obviate the aforementioned problems.

SUMMARY OF THE INVENTION

The main objective of the invention is to provide a barbecue grill that has an adjustable grid and is convenient and versatile in use. The barbecue grill has a stand, a body, a grid and an adjusting device. The body is attached to the top of the stand. The grid is adjustably mounted on the body with the adjusting device. The adjusting device has a shaft and a positioning device. The shaft is moveably extendable through the body and is rotatably connected to the grid. The positioning device is mounted between the body and the grid and is connected to the shaft to hold the shaft at a desired position. With such an arrangement the grid can be rotated away from the body when the user wants to add charcoal into the body or pick the roasted food from the grid. Thus, the use of the barbecue grill is convenient a nd versatile.

Other objects, advantages and novel features of the invention will become more apparent from the following detailed description when taken in conjunction with the accompanying drawings.

DETAILED DESCRIPTION OF PREFERRED EMBODIMENT

Figure 1:
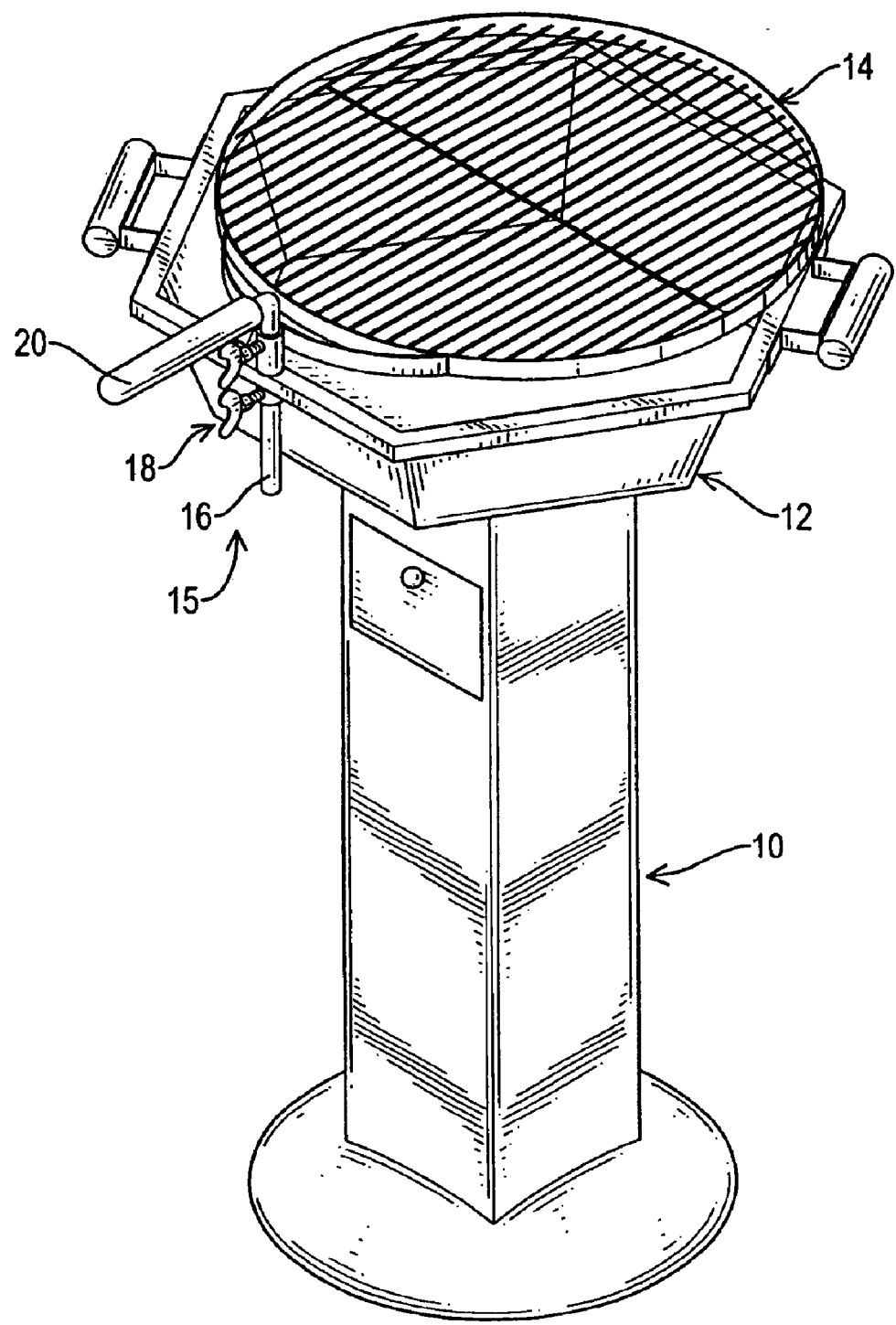
FIG. 1 is a perspective view of a barbecue grill in accordance with the present invention.
Figure 2:
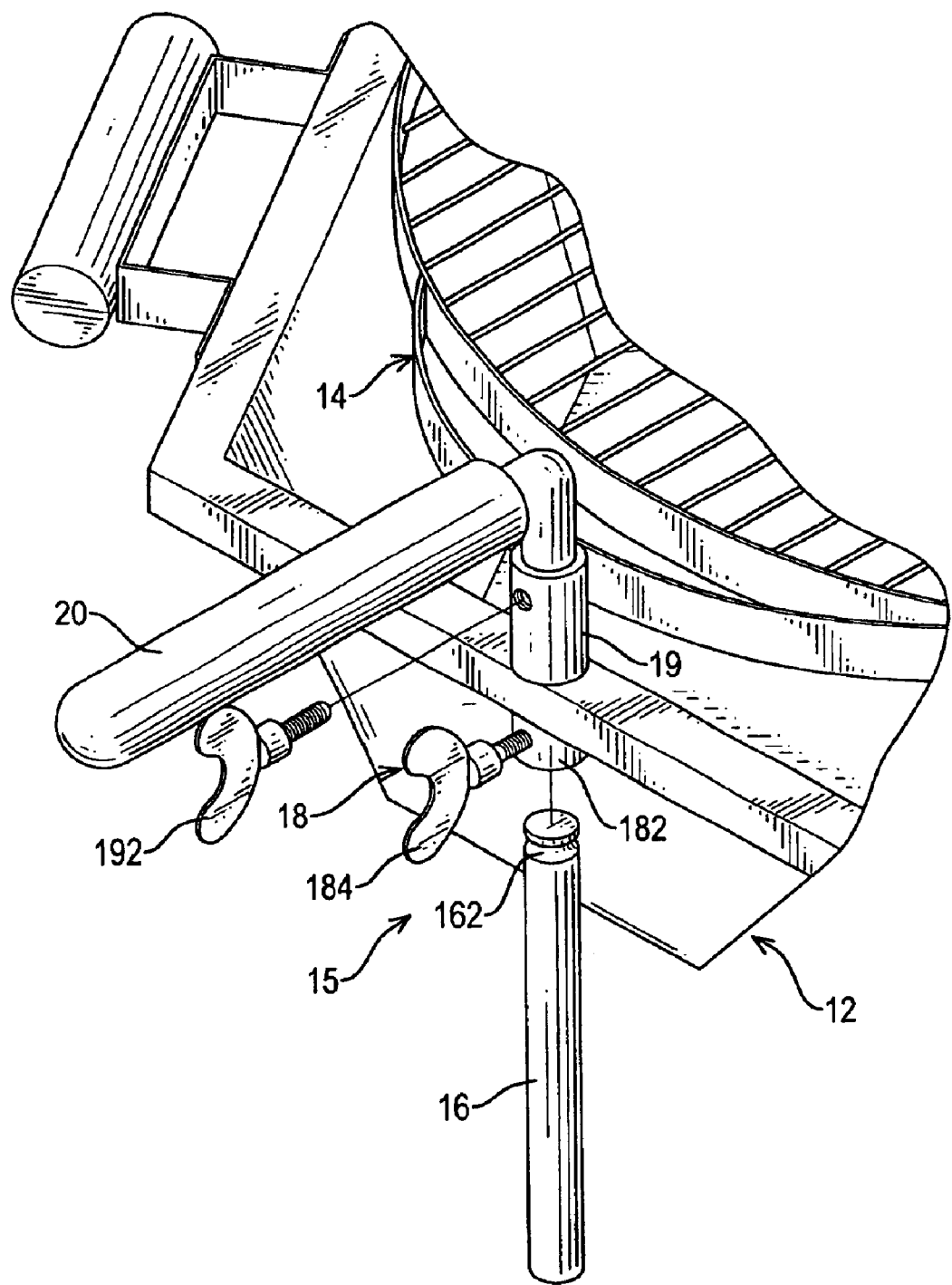
FIG. 2 is an exploded perspective view of the adjusting device of the barbecue grill in FIG. 1.

With reference to FIGS. 1 and 2, a barbecue grill in accordance with the present invention comprises a stand (10), a body (12), a grid (14) and an adjusting device (15).

The stand (10) has a top. The body (12) is attached to and supported on the top of the stand (10). The structures of the stand (10) and the body (12) can be same as conventional ones and are not further described.

The grid (14) is adjustably mounted on the body (12) with the adjusting device (15). The adjusting device (15) comprises a shaft (16) and a positioning device (18). The shaft (16) moveably extends through the body (12) and is rotatably connected to the grid (14). To rotatably connect the shaft (16) to the grid (14), a tube (19) is securely mounted on the grip (14) and has a bottom opening. The shaft (16) has a top extending into the bottom opening of the tube (19) and an annular groove (162) defined near the top. A holding screw (192) is screwed into the tube (19) and has a free end extending into the groove (162) in the shaft (16) to rotatably hold the shaft (16) in the tube (19). With the engagement between free end of the holding screw (192) and the groove (162) in the shaft (16), the grid (14) can rotate relative to the shaft (16). In addition, a handle (20) is mounted on the tube (19) for conveniently rotating the grid (14) relative to the shaft (16).

The positioning device (18) is mounted between the body (12) and the grid (14) and connected to the shaft (16) to hold the shaft (16) at a desired position. The positioning device (18) comprises a tubular member (182) and a positioning screw (184). The tubular member (18) is formed on the body (12) and has a through hole extending through the tubular member (18) for the shaft (16) extending through the through hole. The positioning screw (184) is screwed into the tubular member (182) and has a free end abutting against the shaft (16) to hold the shaft (16) in place. With the abutment between the free end of the positioning screw (184) and the shaft (16), the shaft (16) can be positioned at any desired position so that the grid (14) can also be held at any desired position.

Figure 3:
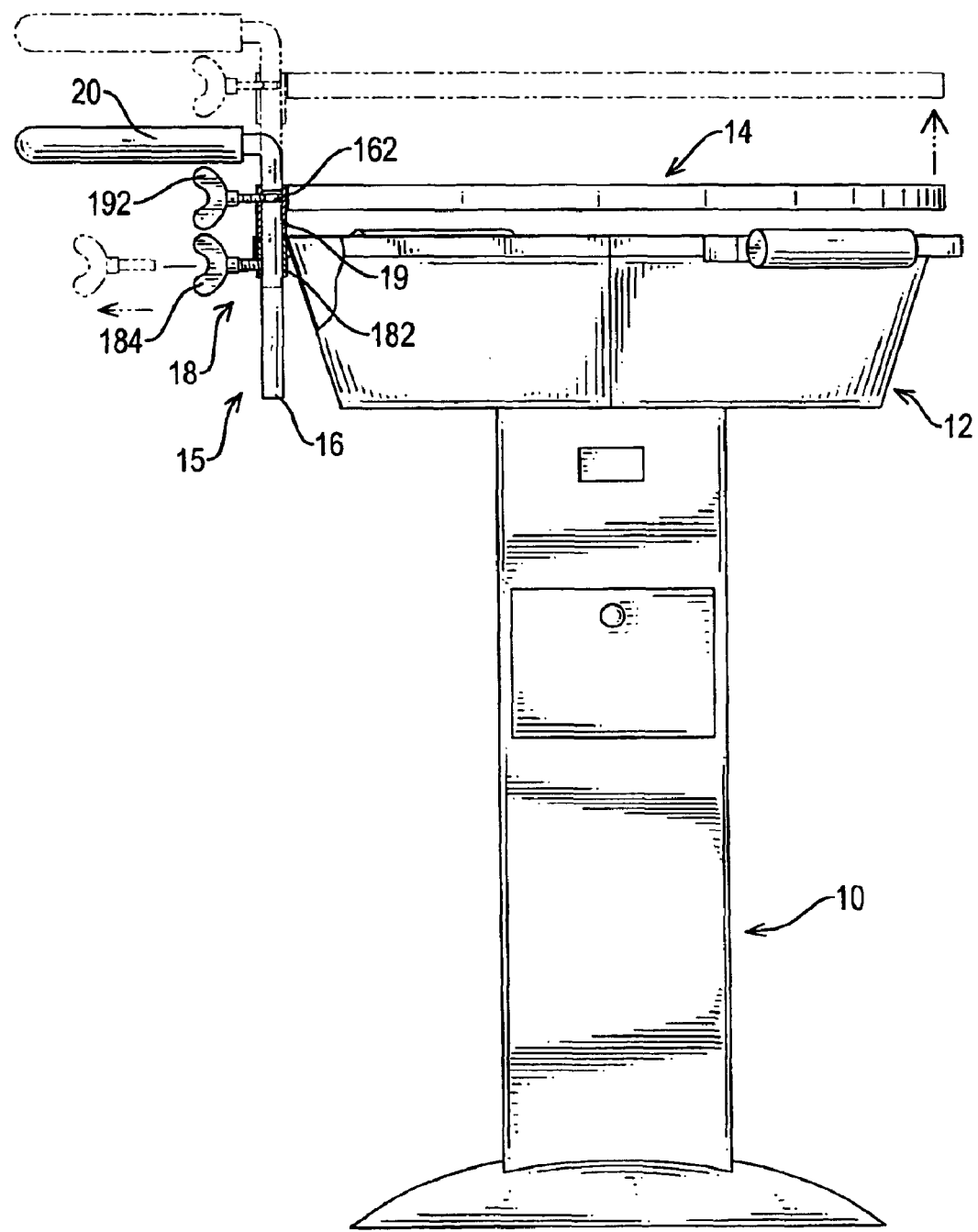
FIG. 3 is an operational side plan view of the barbecue grill in FIG. 1 showing that the grid is adjusted in height.
Figure 4:
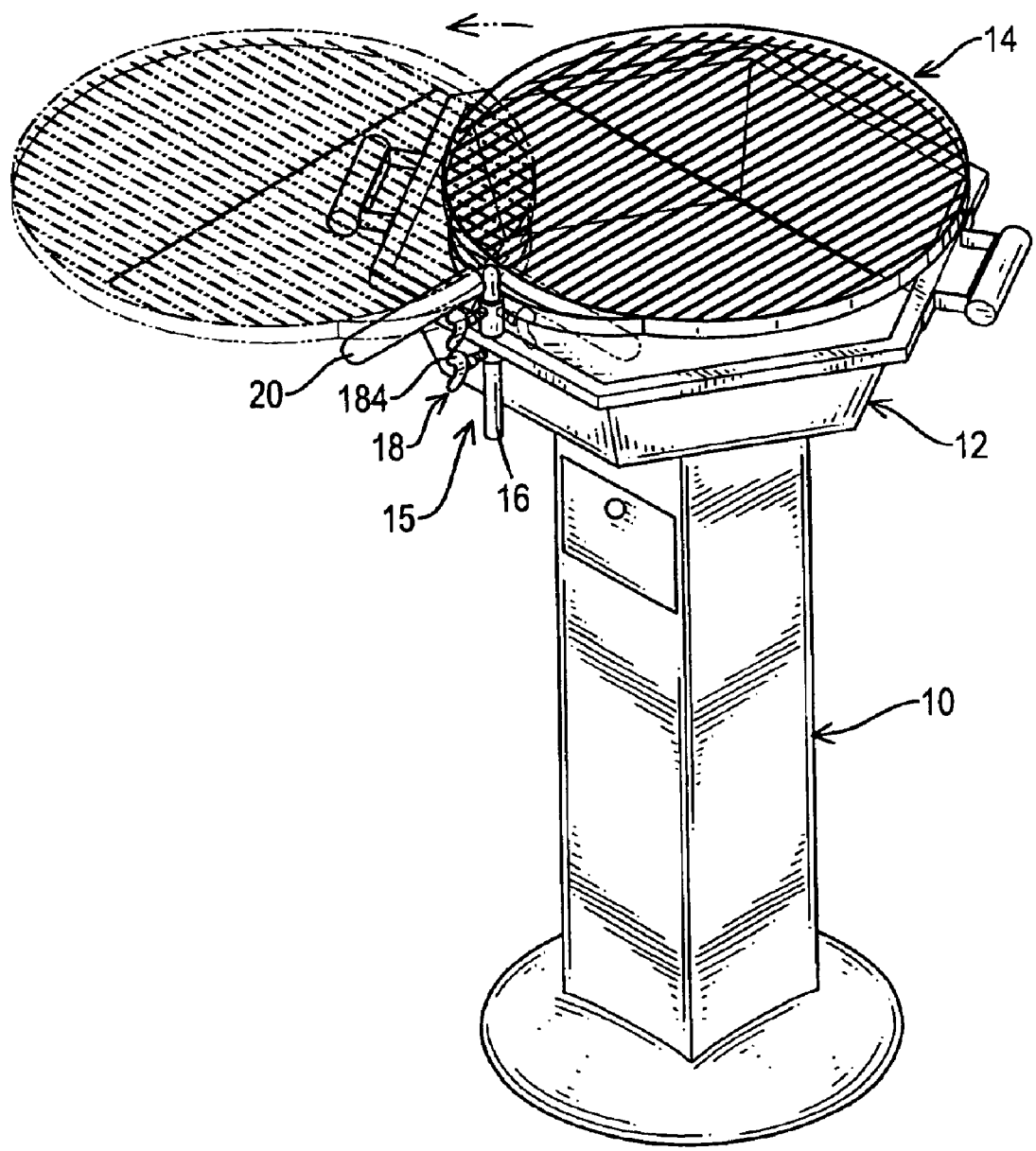
FIG. 4 is an operational perspective view of the barbecue grill in FIG. 1 showing that the grid is rotated away from the body.

With such a barbecue grill, with further reference to FIG. 3, the height of the grid (14) relative to the body (12) can be adjusted by means of releasing the positioning screw (184) and moving the shaft (16) along the tubular member (182). With further reference to FIG. 4, the grid (14) can be rotated relative to the shaft (16) and away from the body (12), such that the user can add charcoal into the body (12) conveniently. In addition, the user will not be burned when the user picks the roasted food from the removed grid (14), such that the use of the barbecue grill is convenient and versatile.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A barbecue grill comprising:
   a stand with a top;
   a body attached to the top of the stand; and
   a grid adjustably mounted on the body with an adjusting device,
   wherein, the adjusting device comprises
      a shaft moveably extending through the body and rotatably connected to the grid; and
      a positioning device mounted between the body and the grid and connected to the shaft to hold the shaft at a desired position.

2. The barbecue grill as claimed in claim 1, wherein the positioning device comprises
- a tubular member formed on the body and having a through hole extending through the tubular member for the shaft extending through the through hole; and
- a positioning screw screwed into the tubular member and having a free end abutting against the shaft to hold the shaft in place.

3. The barbecue grill as claimed in claim 2, wherein
- a tube is securely mounted on the grip and has a bottom opening;
- the shaft has a top extending into the bottom opening of the tube and an annular groove defined near the top; and
- a holding screw screwed into the tube and has a free end extending into the groove in the shaft to rotatably hold the shaft in the tube.

4. The barbecue grill as claimed in claim 3 further comprising a handle mounted on the tube.

5. The barbecue grill as claimed in claim 1, wherein
- a tube is securely mounted on the grip and has a bottom opening;
- the shaft has a top extending into the bottom opening of the tube and an annular groove defined near the top; and
- a holding screw screwed into the tube and has a free end extending into the groove in the shaft to rotatably hold the shaft in the tube.

6. The barbecue grill as claimed in claim 5 further comprising a handle mounted on the tube.

* * * * *